United States Patent [19]

Jaaskelainen

[11] 3,978,591

[45] Sept. 7, 1976

[54] COMPASS, IN PARTICULAR FOR SKI AND COMPETITION TRACK FINDING

[76] Inventor: Erkki Kalle Jaaskelainen, Haukilahti, Finland

[22] Filed: Oct. 7, 1974

[21] Appl. No.: 512,927

[30] Foreign Application Priority Data
Nov. 6, 1973   Finland .............................. 3425/73

[52] U.S. Cl. ................................. 33/334; 24/3 R; 24/265 WS; 33/347; 33/355 R; 33/373
[51] Int. Cl.² ..................... G01C 17/02; A45F 5/00
[58] Field of Search ............ 33/262, 272, 334, 347, 33/355, 370, 371, 372, 373; 24/3 R, 16 R, 197, 200, 265 WS

[56] References Cited
UNITED STATES PATENTS

| | | | |
|---|---|---|---|
| 390,115 | 9/1888 | Delany ................................ | 33/373 |
| 1,258,919 | 3/1918 | Lederer ........................... | 24/265 WS |
| 3,209,464 | 10/1965 | Glatt ................................... | 33/373 |
| 3,484,943 | 12/1969 | Yarbrough ........................... | 33/370 |

FOREIGN PATENTS OR APPLICATIONS

| | | | |
|---|---|---|---|
| 124,584 | 3/1919 | United Kingdom .................. | 33/373 |

*Primary Examiner*—Richard E. Aegerter
*Assistant Examiner*—Steven L. Stephan
*Attorney, Agent, or Firm*—V. Alexander Scher

[57] ABSTRACT

A compass, in particular one intended to be used for track finding on skis or in track finding races, which is affixed to the user's hand with a strap, and which compass is eminently convenient to use in said circumstances. The invention is particularly characterized in that the strap, one end of which has been affixed to the compass, passes slidably through an aperture in the base plate of the compass, forming an adjustable thumb loop, and that the part of the strap protruding from the aperture has a length enabling the strap to be wound around the wrist, and that the end portion of the strap can be secured in connection with compass or with the strap by buckle or equivalent so that the compass will be positioned upon the upper edge of the hand, adjacent to the thumb groin. The buckle or equivalent may be attached to the thumb loop.

3 Claims, 1 Drawing Figure

U.S. Patent  Sept. 7, 1976  3,978,591
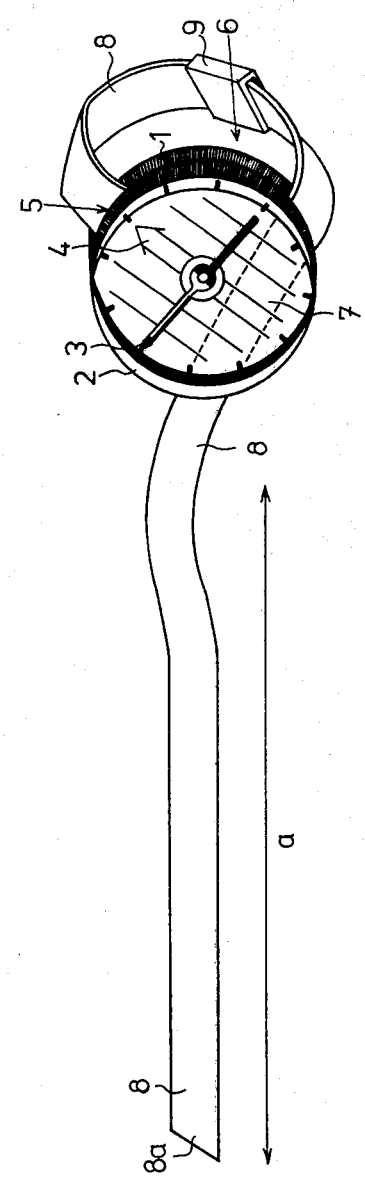

COMPASS, IN PARTICULAR FOR SKI AND COMPETITION TRACK FINDING

The present invention concerns a compass, in particular one intended for use in connection with track finding on skis and in track finding races and which compass is held on the track finder's hand by a strap.

Compasses which can be carried on the hand similarly as wristwatches are known in prior art. However, when used particularly in connection with ski and top-level track finding such compasses have the drawback that when it is desired to take a bearing, it is necessary to raise the arm carrying the compass from the side to the front and simultaneously turn the wrist so that the compass is brought into a position appropriate for the taking of a bearing. The necessity of paying attention to the manner in which this motion is carried out detracts from the speed of progress through the terrain and the procedure in itself consumes a certain time. Furthermore, as a result of the motion, if it is carried out swiftly, some time will pass until the compass needle becomes stationary and the bearing can be taken.

The aim of the present invention is to provide a compass in which the drawbacks mentioned have been virtually completely eliminated. To this purpose, the invention is mainly characterized in that the strap, one end of which has been affixed to the compass, passes slidably through an aperture in the base plate of the compass, thereby forming an adjustable thumb loop, and that the part of the strap projecting from the aperture has such a length that it can be wound around the wrist and the end portion of the strap is attachable to the compass or to the strap by means of a buckle or equivalent so that the compass will be positioned upon the upper edge of the hand adjacent to the thumb notch.

Since the compass according to the invention is affixed upon the upper edge of the hand and adjacent to the thumb notch, the compass can be directly brought into a convenient position for bearing-taking, into the user's field of vision. In track finding on skis the ski staff does not impede the use of the compass in any way, and the compass can be affixed over a skiing glove.

The invention is described in detail with reference to an embodiment of the invention, presented in axonometric view in the attached drawing, but to which embodiment the invention is in no way confined.

The compass according to the figure in the drawing comprises a base plate 1 and upon this a transparent compass needle box 2, inside which a compass needle 3 has been carried on bearings. The needle box 2 is most appropriately fixed and has on its bottom a compass graduation with direction arrow 4, this graduation being counterclockwise, so that when the track is determined to agree with a given bearing, the compass needle 3 is maintained in register with the point of the graduation indicating the desired direction, while the direction arrow 4 points in the direction of travel. When the compass has been affixed to the hand, the direction arrow 4 will be substantially parallel with the user's thumb.

To enable the compass to be affixed to the hand, a strap 8 has been attached to the base plate 1 of the compass at the point 5, this strap preferably consisting of an elastic material. The strap 8 passes through an aperture 7 provided in the base plate 1, so that a loop 6 is formed, which is placed around the thumb. The aperture 7 has a shape consistent with the cross section of the strap 8 and it is such that the strap may slide in it with a friction fit, so that the size of the loop 6 is adjustable and the loop 6 can be tightened around the thumb.

The part of the strap 8 protruding from the aperture 7 and marked with $a$ in the FIGURE, is of such length that it can be wrapped around the wrist, starting on the inside of the wrist, and that the end portion 8a of the strap 8 can be fixed in connection with the compass or with the strap 8. The compass will hereby be secured upon the upper edge of the hand adjacent to the thumb notch (to the base of the thumb) both by means of the thumb loop 6 and by the wrist loop.

For the attachment of the end portion 8a of the strap 8 in the FIGURE a buckle 9 has been schematically shown, which is most appropriately positioned on the loop 6. When the compass is affixed to the hand, the buckle 9 will lie adjacent to the aperture 7. The buckle 9, or another equivalent fixing member, may also be affixed to the body of the compass or to the part of the strap marked 8a. It is merely essential that the thumb loop 6 and the wrist loop can be firmly tightened.

I claim:

1. In combination with a compass having a compass needle box containing a compass needle, compass graduations and a base plate with an opening, a device adapting the compass for use in cross-country track finding and in track finding on skis, said device being adapted to affix the compass to the wrist of a user having a hand and a thumb notch, the device being affixable upon the upper edge of the hand adjacent to the thumb notch and comprising an elongated strap, affixed at one end to said base plate and having a free other end, said strap passing complementary slidably through said opening said opening being arranged in said base plate so that as said strap extends therethrough it is held at an angle with respect to said one end so as to define a thumb loop of adjustable size constituting a part of said strap lying between said one end of said strap and said opening, said thumb loop being adapted to encircle the base of a thumb; and closure means disposed in said thumb loop for affixing said free end of said strap thereto, said strap passing when the compass is attached to the hand, starting from said one end, once around the base of the thumb through said opening and further being adapted to go around the wrist to said closure means.

2. A device according to claim 1, wherein said closure means are mounted upon said thumb loop.

3. A device according to claim 2, wherein said closure means comprises a buckle.

UNITED STATES PATENT OFFICE
CERTIFICATE OF CORRECTION

Patent No. 3,978,591    Dated September 7, 1976

Inventor(s) Erkki Kalle Jaaskelainen

It is certified that error appears in the above-identified patent and that said Letters Patent are hereby corrected as shown below:

On the cover sheet insert:

-- [73] Assignee:   Suunto Oy

Van-hakartano, Findland --.

Signed and Sealed this

Thirtieth Day of November 1976

[SEAL]

Attest:

RUTH C. MASON
*Attesting Officer*

C. MARSHALL DANN
*Commissioner of Patents and Trademarks*